THOMAS N. HICKCOX.

Improvement in Metallic Plates for Roofing.

No. 125,294.            Patented April 2, 1872.

125,294

UNITED STATES PATENT OFFICE.

THOMAS N. HICKCOX, OF BROOKLYN, NEW YORK.

IMPROVEMENT IN METALLIC PLATES FOR ROOFING.

Specification forming part of Letters Patent No. 125,294, dated April 2, 1872.

*To all whom it may concern:*

Be it known that I, THOMAS N. HICKCOX, of Brooklyn, in the county of Kings and State of New York, have invented a new and useful Improvement in Tin and other Metal Plates for Roofing Purposes; and I do hereby declare that the following is a full, clear, and exact description thereof, reference being had to the accompanying drawing forming a part of this specification.

This invention consists in plates having a plain or smooth margin to provide for soldering them together, but having their other parts so stamped, embossed, or corrugated that each one will to a great extent take up its own expansion within itself, and will not, by its expansion and contraction, exert so great an influence upon contiguous or adjacent plates, or the joints which connect them.

Figure 1:
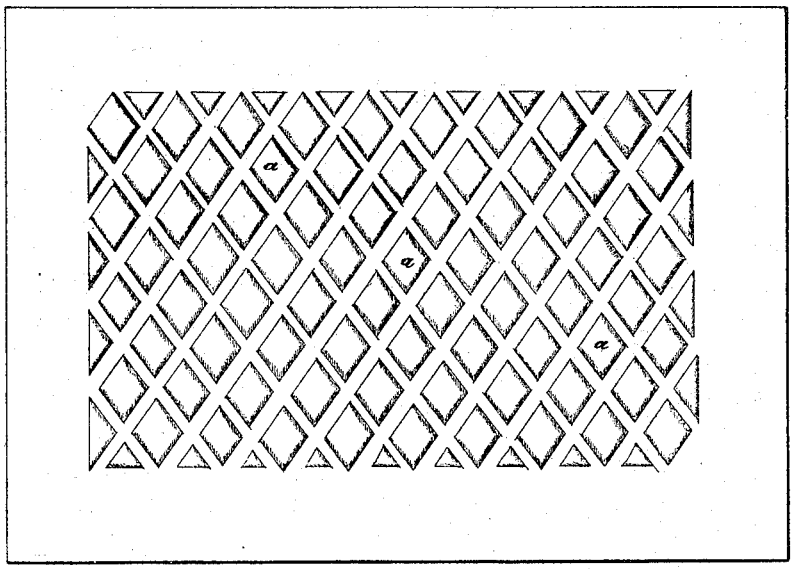
Figure 2:

In the accompanying drawing, Figure 1 is a face view of a plate made according to my invention, and Fig. 2 is a transverse section of the same.

Similar letters of reference indicate corresponding parts in both figures.

The plate represented in the drawing has the whole of its area, except a narrow space around its edges, with a series of diamond-shaped figures, *a a*, which are arranged in lines with their sides at an angle to the edges of the plate and their opposite angles in line with the same. These figures are struck up from only one side of the plate, thereby leaving one side—that which lies next the roof—free from projections. The marginal portion of the plate is for a sufficient width left flat or plain, to provide for the soldering together of the edges of adjacent plates, which may be done in the same way as the soldering of the plates of ordinary tin roofs. Any expansion or contraction of these plates in a roof will, instead of causing the whole roof to buckle up or tear the plates asunder, in a great degree be taken up within each plate, according to its own due proportion, by causing the embossment to rise from the general surface of the plate. The design of the embossment or corrugation may be varied.

I do not claim, broadly, the corrugations or embossment of roofing-plates.

What I claim as my invention, and desire to secure by Letters Patent, is—

Roofing-plates made with a flat or plain margin, and with the middle or inner portion embossed or corrugated, substantially as herein described.

THOMAS N. HICKCOX.

Witnesses:
SAMUEL FROST,
RICHD. C. REYNOLDS.